US010063127B2

(12) United States Patent
Nashiki

(10) Patent No.: US 10,063,127 B2
(45) Date of Patent: Aug. 28, 2018

(54) MULTIPLE-PHASE AC ELECTRIC MOTOR WHOSE ROTOR IS EQUIPPED WITH FIELD WINDING AND DIODE

(71) Applicant: Masayuki Nashiki, Aichi-ken (JP)

(72) Inventor: Masayuki Nashiki, Aichi-ken (JP)

( * ) Notice: Subject to any disclaimer, the term of this patent is extended or adjusted under 35 U.S.C. 154(b) by 248 days.

(21) Appl. No.: 14/608,506

(22) Filed: Jan. 29, 2015

(65) Prior Publication Data

US 2016/0226356 A1 Aug. 4, 2016

(51) Int. Cl.
*H02K 19/12* (2006.01)
*H02K 11/042* (2016.01)
*H02K 21/04* (2006.01)
*H02K 1/24* (2006.01)

(52) U.S. Cl.
CPC .......... *H02K 19/12* (2013.01); *H02K 11/042* (2013.01); *H02K 21/042* (2013.01); *H02K 1/246* (2013.01)

(58) Field of Classification Search
CPC ........ H02K 19/12; H02K 19/26; H02K 19/28; H02K 19/30; H02K 19/32; H02K 11/042; H02K 11/044; H02K 21/042; H02K 1/246; H02K 1/24
USPC ............... 310/68 D, 165, 184–185, 198–208
See application file for complete search history.

(56) References Cited

U.S. PATENT DOCUMENTS

| 2010/0259136 A1* | 10/2010 | Hiramoto | ............... | H02K 19/12 310/68 D |
| 2011/0050025 A1* | 3/2011 | Doushita | ................ | H02K 1/146 310/198 |
| 2011/0241599 A1* | 10/2011 | Nashiki | ................... | B60L 3/003 318/724 |
| 2012/0313492 A1* | 12/2012 | Yamada | ................ | H02K 19/12 310/68 D |

FOREIGN PATENT DOCUMENTS

| JP | 04-285454 | 10/1992 |
| JP | 2004-166476 | 6/2004 |
| JP | 2011-041433 | 2/2011 |

\* cited by examiner

*Primary Examiner* — Michael Andrews
(74) *Attorney, Agent, or Firm* — Clark & Brody

(57) ABSTRACT

A motor and an inverter are configured to present higher performance and to be produced in a compact side and lower cost. In an AC motor having four or more poles, stator windings for the same phase are wound at deferent circumferential positions. Using these stator windings, power required for field windings in a rotor is supplied from the stator side to the rotor side. In the rotor, a plurality of power reception windings are provided and outputs from the power reception windings are rectified to provide a field current to the field windings.

10 Claims, 9 Drawing Sheets

MULTIPLE-PHASE AC ELECTRIC MOTOR WHOSE ROTOR IS EQUIPPED WITH FIELD WINDING AND DIODE

BACKGROUND OF THE INVENTION

Technical Field

The present invention relates to an electric motor which can be used as a main machine for electric vehicles and also can be used in various applications including industrial motors and generators, Related Art In electric vehicles, there is mounted an electric motor which generates power as a man-machine motor, For the main-machine motor, the motor is frequently confronted with a severe running condition when the vehicle climbs a hill. Even when a motor whose high-efficiency and high power factor are given in its operating range for high frequency of usage is used as the main-machine motor, the motor still has a problem. The problem is that the power factor drops down to about 0.6 and a copper loss becomes larger in a driving mode which needs lower rotation speeds and larger amounts of torque in a hill-climbing run of the vehicle. For example, compared with current phase gained at a power factor of 1.0, the current phase at a power factor of 0.6 is −53.13 degrees, and the copper loss increases up to an amount which is 2.777 times ($=1/(0.6 \times 0.6)$). The current capacity of an inverter increases up to an amount which is 1.666 times ($=1/0.6$), When the motor loss is larger in an operating mode requiring larger amounts of torque, the motor becomes larger in its size, thereby increasing production cost thereof. Meanwhile, the main-machine motor mounted in, for example, electric vehicles need a wider torque characteristic ranging from a basic rotation speed to a high rotation speed.

FIG. 13 is a lateral sectional view illustrating a rotor 279 equipped with a diode 27A and field windings 271-278 electrically and serially connected to the diode. The field windings 271 and 272, which are wound as illustrated in the drawing, magnetically excite an N-magnetic pole 27F. A reference 27G shows a coil end portion of the field windings 271 and 272. Similarly, the field windings 273, 274; 275, 276; and 277, 278 are wound in series to each other so as to provide predetermined directional currents in the rotor 279. FIG. 13 also shows an equivalent circuit of electrical connections among the field windings and the diode 27A.

In this rotor 279, a stator-side field current Isf (not shown) increases from zero, each of the rotor magnetic poles is magnetically excited to produce a field magnetic flux φf (not shown) which increases proportionally to an increase in the field current Isf. During the increase in the field magnetic flux φf, a rotor field current If will not follow due to a negative voltage Vf (not shown) generated through the rotor field windings in FIG. 13, (a). The field current Isf on the stator side starts to reduce, a positive voltage Vf (which is expressed by "−dφf/dt") is generated proportionally to the number of windings, whereby the field current If starts to flow in the forward direction of the diode 27A. Further, at the moment when the stator-side field current Isf becomes zero, the rotor field current If still maintains generation of the field magnetic flux φf. However, the field magnetic flux φf reduces with time. Hence, supply of the stator-side field current Isf in a pulsed manner makes it possible to maintain the field magnetic flux φf at an approximately constant amount. Incidentally the field current Isf can be refereed as a d-axis current component.

However the motor structure shown in FIG. 13 has various drawbacks. One drawback is that the field current Isf becomes larger when the motor is driven at lower speeds and larger amounts of torque. As a result, it is difficult to largely reduce the copper loss of the stator. Another drawback is about the size of an inverter to drive the motor. That is, since the inverter has to perform switchovers among larger amounts of currents, this becomes an obstacle in reducing the size of the inverter. Another drawback comes from the intermittent control of the field current Isf. This control results in generation of ripples of torque, vibration and noise. These drawbacks are due to the fact magnetic energy of the field can be supplied from the stator to the rotor 279 but power cannot be supplied to the rotor like electric transformers. In addition, in the structure shown in FIG. 13, spatial harmonic components of the motor generate voltages across the field windings, but advantages thanks to these voltages are limited in a desired range where rotation speeds are lower which need larger amounts of torque.

Another main-machine motor is exemplified in JP-B-5363913, in which a three-phase full-pitch winding, and distributed-winding motor is provided. However, this motor has drawbacks which include a longer length of the coil ends which are due to its complex structure, a lower space factor of the windings in slots, and higher production costs.

[PTL 1] JP-B-5363913
[PTL 2] JP-A-2004-166476

SUMMARY

Hence, it is desired to provide an electric motor which can be produced in a compact size and lower cost and how to produce field magnetic fluxes highly reliably.

According to one aspect of the disclosure, there is provided a multiple-phase n AC electric motor provided with four or more poles. The motor comprises power supply windings PSW magnetically exciting AC magnetic flux components generated at a cycle corresponding to QN-times of an electoral angle of 360 degrees in a circumferential direction of a stator, wherein the QN is a variable of 2 or more; a first power reception winding PRW1 arranged at circumferential positions in the rotor at a winding pitch corresponding to an integer multiple of an electrical angle of 360 degrees in the circumferential direction, the first power reception winding PRW1 receiving a field power; a second power reception winding PRW2 arranged at circumferential positions in the rotor at a winding pitch corresponding to an integer multiple of an electrical angle of 360 degrees in the circumferential direction, the second power reception winding PRW2 receiving the field power, the circumferential positions of the second power reception winding PRW2 being different from the circumferential positions of the first power reception winding PRW1; a rectifier REC1 arranged in the rotor to rectify an output of the first power reception winding PRW1; a rectifier REC2 arranged in the rotor to rectify an output of the second power reception winding PRW2; a field winding FM wound around an N magnetic pole, an S magnetic pole, or both the N and S magnetic poles; and a circuit supplying a field current If to the field winding FM based on the outputs of the rectifiers REC1 and REC2 so that the N and S magnetic poles are magnetically excited.

As a result, changing connections of the stator windings and current supply methods makes it possible to provide the field excitation power to the rotor side using the stator windings. The rotor field winding type of motor can be produced in a compact size and at lower cost.

According to another aspect, in the foregoing configuration, the power supply windings PSW includes a plurality of windings for a U-phase which composes one of the multiple phases, the AC motor comprising: a U1-phase winding U1M which is one of the windings for the U-phase; a U2-phase winding U2M is one of the windings for the U-phase, the U2-phase winding U2M being wound at a circumferential position different from a circumferential position of the U1-phase winding U1M within an electrical angle range of 360 degrees×QN in the circumferential direction; a driver DRU1 supplying a U1-phase current Iu1 in which a U-phase current component and a stator-side field excitation current component If2 are superposed on one the other; and a driver DRU2 supplying a U2-phase current Iu2 in which the U-phase current component and a negative field excitation current component −If2 are superposed on one the other. According to this configuration, a rotor field winding type of motor can be produced in a compact size and lower cost.

According to another aspect, in the foregoing configuration, the N and S magnetic poles of the rotor comprising: a plurality of soft magnetic portions positioned parallel to each other, an air gap, a resin member, or a permanent magnet positioned between the soft magnetic portions, and a permanent magnet arranged magnetically serially to a path of the soft magnetic portions in a magnetic flux direction of the path. In this configuration, an electromagnetic load in exciting the field magnetic fluxes can be alleviated by using the permanent magnet additionally arranged.

According to another aspect, in the foregoing configuration, the rotor has permanent magnets arranged therein, magnetic characteristics of part of the permanent magnets being controllable by a magnetomotive force of the stator windings. In this configuration, an electromagnetic load in exciting the field magnetic fluxes can be alleviated.

According to another aspect, in the foregoing configuration, the motor is a five-phase motor having four or more poles, the five phases consisting of an A-phase, a B-phase, a C-phase, a D-phase, and an E-phase arranged in this order in the stator, the A- to E-phases are located within a range of 0 to 720 degrees in the electrical angle in the circumferential direction, the five-phase motor comprising: A-phase windings wound in slots located at electrical angles 0 and 144 degrees, B-phase windings wound in slots located at electrical angles 72 and 216 degrees, C-phase windings wound in slots located at electrical angles 144 and 288 degrees, D-phase windings wound in slots located at electrical angles 216 and 360 degrees, and E-phase windings wound in slots located at electrical angles 288 and 72 degrees.

In this configuration, it is possible to simplify intersections of the respective five-phase windings at its coil end portions, thus improving productivity and making the coil end portions into a compact structure.

According to another aspect, in the foregoing configuration, the motor is a five-phase motor having eight or more poles, the five phases consisting of an A-phase, a B-phase, a C-phase, a D-phase, and an E-phase arranged in this order in the circumferential direction in the stator, the A- to E-phases are located within a range of 0 to 1440 degrees in the electrical angle in the circumferential direction, the five-phase motor comprising: A-phase windings wound in slots located at electrical angles 0 and 144 degrees, C-phase windings wound in slots located at electrical angles 144 and 288 degrees, E-phase windings wound in slots located at electrical angles 288 and 432 degrees, B-phase windings wound in slots located at electrical angles 432 and 576 degrees, and D-phase windings wound in slots located at electrical angles 576 and 720 degrees, wherein the A-, C-, E-, B- and D-phase windings are wound, in the same way as the above, within a range of 720 to 1440 degrees in the electrical angle in the circumferential direction.

In this configuration, it is also possible to simplify intersections of the respective five-phase windings at its coil end portions, thus improving productivity and making the coil end portions into a compact structure.

According to another aspect, in the foregoing configuration, the power supply winding PSW is wound to excite AC magnetic fluxes at a cycle corresponding to QN times of an electrical angle 360 degrees in the circumferential direction of the stator, and is provided as a power supply winding PSWS different from windings which supply a multiple-phase AC current.

In this configuration, few windings are added to the stator windings. Utilizing the added windings, field excitation power can be provided to the rotor side, whereby a rotor field winding type of motor can be produced in a compact size and lower cost.

According to another aspect, in the foregoing configuration, the motor comprising a configuration increasing or decreasing an AC field excitation current component If2 supplied to the power supply winding PSW so that the field current If is increased or decreased, wherein the field excitation current component If2 is required on the stator side in order to supply the field current If to the field winding FM, and a configuration detecting rotation positions of the rotor by detecting changes in voltage components induced, due to electromagnetic induction, across each of the respective phase windings of the stator in response to changes in the field excitation current component If2. Hence, the motor can be driven with no sensors for detecting rotation positions and produced at lower cost, providing reliably to the motor.

DETAILED DESCRIPTION OF PREFERRED EMBODIMENTS

The purpose of the present invention is to provide higher-efficient a main-machine motor suitable for electric vehicles or other apparatuses, in which the motor can be produced in a compact size and at lower cost. The present invention particularly targets a motor whose rotation speed range is wide, which can be driven in a so-called constant output control, and which is able to provide larger-torque output efficiently in a lower rotation speed range. Such a motor is desired as a main-machine motor for electric vehicles. The main-machine motor requires quick activation from the stationary state, forward reverse drive at lower speeds, and a wide drive range from lower speeds to higher speeds. Particularly, a larger amount of torque is required in climbing on steeper sloping roads, so that this is an important factor in design of the motor. It is frequent that the size and cost of a motor in this application are generally decided by power loss, heat generation and temperature increase caused when the moor rotates at lower speeds and with larger amounts of torque. The present invention therefore aims at obtaining a higher power factor in a lower rotation range with larger amounts of torque, optimizing the structure of a rotor, and optimizing the number of phases of a stator and the structure of the stator. Techniques for such factors are crossly related to each other and if combined well, greater synergy effects can be obtained.

[First Embodiment]

An embodiment according to claims 1 and 2 will now be described.

Figure 1:
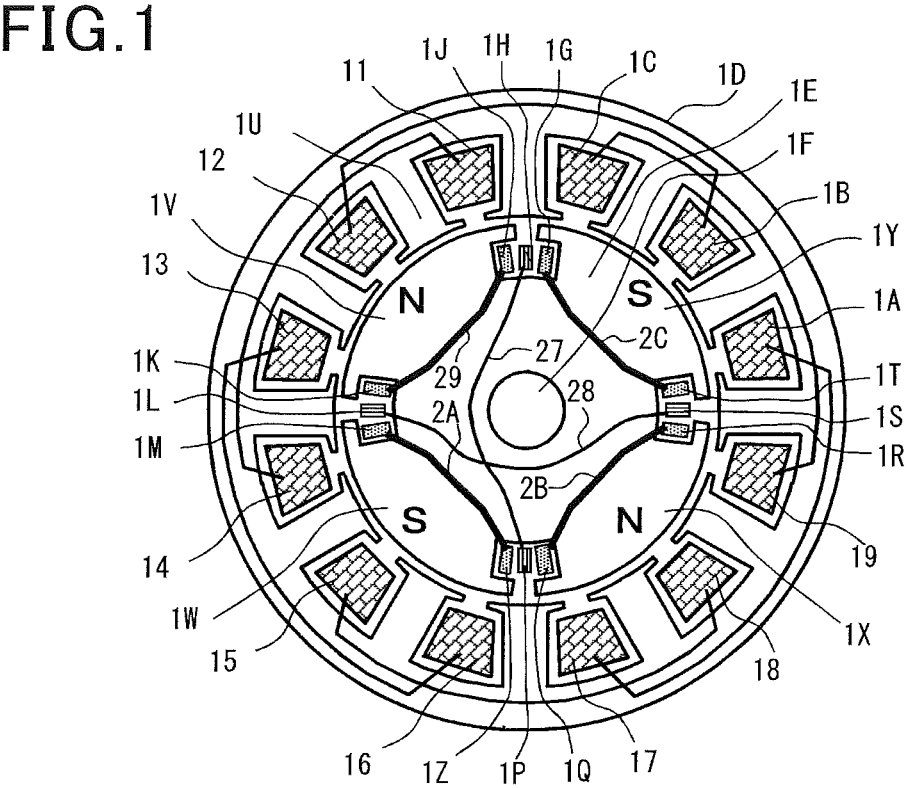
FIG. 1 is a sectional view showing a three-phase four-pole motor according to an embodiment.

FIG. 1 shows a sectional view taken along a lateral plane perpendicular to the longitudinal direction of an AC motor according to the present embodiment. Practically, FIG. 1 shows arrangement of stator windings wound at one of the coil end portions of the AC motor. This AC motor is a three-phase and four-pole AC synchronous motor of field winding type. In FIG. 1, the AC motor is provided with a stator core 1D, twelve stator teeth 1U, a U-phase winding, and a W-phase winding. The U-phase winding is composed of a U1-phase winding wound through a slot 11 to a slot 14 and a U2-phase winding wound through a slot 17 to a slot 1A. The V-phase winding is composed of a winding wound through a slot 13 to a slot 16. The W-phase winding is composed of a winding wound through a slot 15 to a slot 18 and a winding would through a slot 1B to a slot 12. These windings are wound in and through respective slots formed by respective teeth 1U, in which the teeth are twelve in number and formed on the periphery of the stator. The stator shown in FIG. 1 has windings which are for thee-phases, four magnetic poles, full-pitch windings and concentrated windings. In each slot, the windings for only one phase are wound, so that the structure is simplified. Hence, productivity can be excellent and production cost can be lowered.

A reference numeral 1E shows a rotor, a reference numeral 1F shows a rotor shaft, reference numerals 1V and 1X show N magnetic poles of the rotor, and reference numerals 1W and 1Y show S magnetic poles of the rotor. Winnings wound from 1H to 1P are power reception windings across which field power-supply magnetic flux supplied at the stator interlinks. A reference numeral 27 shows a connection connecting coil ends of the power reception windings. The windings are wound at a pitch corresponding to an electrical angle of 360 degrees. Winnings wound from 1L to 1S is power reception windings configured in the same manner as the above, and a reference numeral 28 shows a connection connecting coil ends of these power reception windings. The windings have a phase difference from that the power reception windings 1H, 1P by an electrical angle of 180 degrees. Winding wound from 1J to 1K are field windings magnetically exciting the N magnetic pole 1V and have coil ends connected by a connection 29. Reference numerals 1M, 1Z and 2A are field windings magnetically exciting the S magnetic pole 1W. Reference numerals 1Q, 1R and 2B are field windings magnetically exciting the N magnetic pole 1X. Reference numerals 1T, 1R and 2C are field windings magnetically exciting the S magnetic pole 1E.

Figure 2:
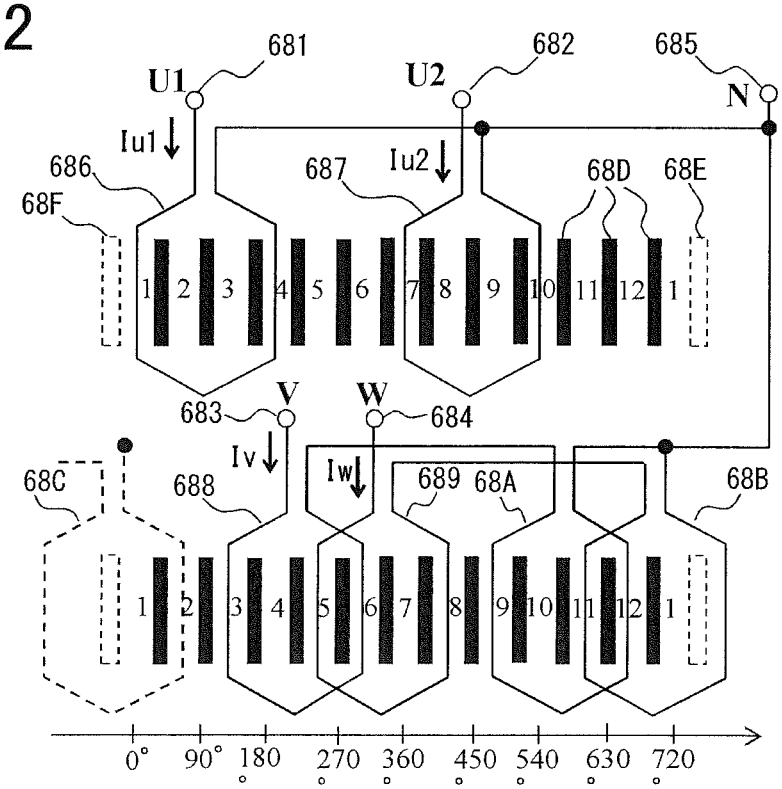
FIG. 2 is a schematic view showing arrangements and connections of a stator windings.

FIG. 2 shows a connection of arrangements of the windings shown in FIG. 1 in order to further clarify the mutual connections and arrangements of the windings shown in FIG. 1. FIG. 2 shows a linearly developed arrangements viewed from the rotor side to the inner circumferential surface of the stator. The horizontal direction in FIG. 2 indicates an electrical angle corresponding to a rotation angle in the circumferential direction. The motor has the four poles, so that a electrical angle of 720 degrees is set for the circumference. Bold lines represents teeth provided in the stator, in which 12 teeth arranged on the circumferential surface. Between mutually adjacent teeth, a slot is formed to accommodate a winding therein. The numbers 1 to 12 are assigned to such slots. If all the windings of the stator are overlapped on one the other in the figure, the drawing becomes complex and difficult to be seen, two sets of teeth of the same stator are provided in the upper and lower parts in FIG. 2, in which U1-phase windings and U2-phase windings are shown in the upper part and V-phase windings and W-phase windings are shown in the lower part. Actually the windings in both the upper and lower parts are overlapped on one the other. Reference numerals 686, 687, 688, 689, 68A and 68B show windings shaped in an approximately hexagonal shape, which is called a hexagonal coil. Each hexagonal coil is here illustrated by a single line drawn in an approximate hexagonal shape, but actually consists of a plurality of windings, which provides for example 50 turns having input and output ends In FIG. 2, a reference numeral 681 shows one winding terminal for the U1-phase and the hexagonal coil 686 is composed of the windings 11 and 14 shown in FIG. 1. The other end of the hexagonal coil 686 is connected to a neutral point 685 of a star connection adopted in this stator. Similarly a reference numeral shows a winding terminal for U2-phase, and the hexagonal coil 687 is composed of the windings 17 and 1A shown in FIG. 1. The other terminal of this hexagonal coil 687 is connected to the neutral point 685. A U1-phase current Iu1 is supplied to the winding terminal 681 and a U2-phase current is supplied to the winding terminal 682, and a relationship formula (1) described later is realized.

In FIG. 2, a reference numeral 683 shows a V-phase winding terminal, the hexagonal coil 688 is composed of the windings 13 and 16 shown in FIG. 1, and the hexagonal coil 68A is composed of the windings 19 and 1C shown in FIG. 1. The other end of the hexagonal coil 68A is connected to the neutral point 685. A reference numeral shows a W-phase winding terminal, the hexagonal coil 689 is composed of the windings 15 and 18 shown in FIG. 1, and the hexagonal coil 68B is composed of the windings 1B and 12 shown in FIG. 1. The other end of the hexagonal coil is also connected to the neutral point 685. In FIG. 2, a reference numeral 68E shown by a broken line imaginarily indicates a left-side tooth adjacently arranged thereto, a reference numeral 68F shown by a broken line imaginarily indicates a right-side tooth adjacently arranged thereto, and a hexagonal coil 68C shown by a broken line is identical to the hexagonal coil 68B.

Figure 3:
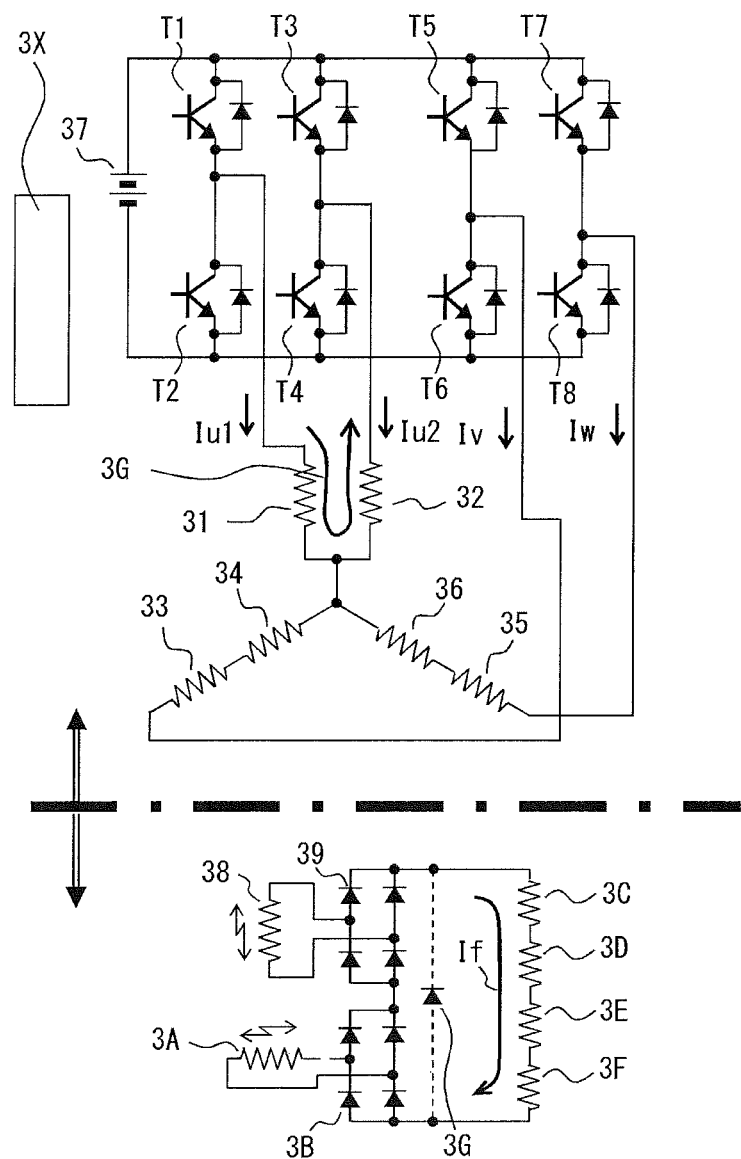
FIG. 3 is a circuit diagram showing connections of windings in a stator and a rotor and how to supply currents.

FIG. 3 is a circuit diagram showing connections of components which supplies field power from the stator side of the motor shown in FIG. 2 and receives the field power to allow supply of field currents. In the figure of FIG. 3, upper and lower parts are drawn which are mutually separated by a bold dashed line, in which the upper part shows a stator side and the lower side a rotor side. A winding 31, which is composed of the U1-phase windings 11 and 14, to which the U1-phase current Iu1 is supplied. A winding 32, which is composed of the U2-phase windings 17 and 1A, to which the U2-phase current Iu2 is supplied. Windings 33 and 34 are connected in series to each other and compose a V-phase winding, in which the winding 33 is composed of the windings 13 and 16 shown in FIG. 1 and the winding 34 is composed of the windings 19 and 1C shown in FIG. 1. A V-phase current Iv is supplied to this V-phase winding. In the similar way to the above, windings 35 and 36 are connected in series to each other and compose a W-phase winding, in which the winding 35 is composed of the windings 15 and 18 shown in FIG. 1 and the winding 36 is composed of the windings 16 and 12 shown in FIG. 1. A W-phase current Iw is supplied to this W-phase winding.

The circuit in FIG. 3 is provided with a DC power supply and eight power control elements T1, T2, T3, T4, T5, T6, T7 and T8 each of which composed of an IGBT and which are driven to supply voltages and currents to the foregoing phase windings. Parallel with each IGBT, a diode is connected to prevent current from passing in the inverse direction. A reference numeral 3× shows a motor controller which controls the motor and, practically, controls not only the voltage and current to each of the IGBTs but also supply of the field power. The motor controller is also configured to detect the field currents from detected values of the phase currents and statuses of IGBTs. The power control elements may be MOSFETs or IiC semiconductors, not limited to the IGBTs.

In the rotor side in FIG. 3, a winding 38 is composed of the windings 1H, 1P and 27 which are provided as the power reception winding in FIG. 1. In addition, a winding 3A is composed of the windings 1L, 1S and 28 which are provided as the power reception winding in FIG. 1. Both windings 38 and 3A are wound at a pitch of 360 degrees and located to have a mutual phase difference of 180 degrees in electrical angle. AC voltage waves induced by these two power reception windings are rectified by the full-wave rectifiers 39 and 3B respectively, and supplied as field voltages and field currents If to the field wingding 3C, 3D, 3E and 3F.

How to supply the field power from the stator of the motor shown in FIGS. 1 and 2, receive the field power, and supply the received power as the field current If will now be described. First, three-phase currents consisting of a U-phase current Iu, a V-phase current Iv, and a W-phase current Iw is described. Both the U1-phase current Iu1 and the U2-phase current Iu2 are controlled so that a sum of both currents Iu1 and Iu2 equals the U-phase current Iu. Under this control, a sum of the three-phase currents becomes zero, thus allowing the motor to act as a normal three-phase motor in terms of electromagnetic operations, thus complying with the following formulas.

$$Iu=Iu1+Iu2 \quad (1)$$

$$Iu+Iv+Iw=0 \quad (2)$$

Utilizing the flexibility of both the U1-phase and U2-phases currents Iu1 and Iu2, a power supply current If2 is supposed differentially on both current Iu1 and Iu2, thus providing the following formulas.

$$Iu1=Iu/2+If2 \quad (3)$$

$$Iu2=Iu/2-If2 \quad (4)$$

This means to supply the power supply current If2 shown by a reference numeral shown in Hg. 3.

As a result, the U1-phase current Iu1 and the U2-phase current Iu2 can be totaled to an amount which can be shown by the following formula, $$Iu1+Iu2=Iu/2+If2+Iu/2-If2=Iu \quad (5),$$

and the U1-phase current Iu1 and the U2-phase current Iu2 can be differentiated to an amount which can be shown by the following formula, $$Iu1-Iu2=2\times If2 \quad (6).$$

The power reception windings 27 and 28 are wound at a winding pitch of 360 degrees and are able to receive magnetic flux components for supplying field power which cycles at 720 degrees as the electrical angle on the stator opposed to the rotor. Since the cycle of magnetic flux components which enable operations of a three-phase motor is 36 degrees, voltage components of the supplied field power do not appear across the poser reception windings 27 and 28, thus causing no effect.

The power reception windings 27 and 28 shown in FIG. 1 are depicted as the power reception windings 38 and 3A in FIG. 3. Voltage and current components transmitted to the power reception winding 38 are rectified by the full-wave rectifier 38, while those components to the remaining power reception winding 3A, whose phase is different by 90 degrees in mechanical angle and 180 degrees in electrical angle from those of the above power reception winding 38, are rectified by the other full-wave rectifier 3B. The output terminals of the two full-wave rectifiers are connected in series to each other via the field windings 3C, 3D, 3E and 3F which are also connected in series to each other and whose current passing directions are made to agree with each other. Outputs of both the full-wave rectifiers are thus provided to this field winding serial connection to allow the field current to pass therethrough. The winding 3C is composed of the winding 1J and 1K shown in FIG. 1, the winding 3D is composed of the winding 1Z and 1M shown in FIG. 1, the winding 3DE is composed of the winding 1Q and 1R shown in FIG. 1, and the winding 3F is composed of the winding 1G and 1T shown in FIG. 1. The reason for using a set of the power reception windings and the two full-wave rectifiers derive from a demand for supply the field power to the field windings at any rotation angle of the rotor. At the times when there are cyclic reductions in the output voltages of the full-wave rectifiers 38 and 3B, the field current If is compensated by flywheel effects caused by the four diodes of each of the full-wave rectifiers.

Referring to FIG. 2, the power supply current If2 shown in the formulas (3) and (4) will now be described in that this current If2 generates a magnetomotive force having which cycle and a magnetic flux component having which cycle. Assume that, in the formula (1), the U-phase current Iu is zero and the V-phase and W-phase currents are also zero. In addition assume that, by way of example, the power supply current If2 in the formulas is 2 A (amperes). In this assumption, the U1-phase current Iu1 is 2 A, the U2-phase current Iu2 is −2 A. As a result, the magnetomotive force acts from the rear side to the front side of the paper of FIG. 2 in a range of the slots 1 to 4, generating magnetic flux φf2. Because the U2-phase current Iu2 is now Iu2=−2 A (amperes), a magnetic force acts from the front side to the rear side of the FIG. 2 in a range from the slots 7 to 10, thus generating opposite-directional magnetic flux φf2 whose cycles are 720 degrees in the electrical angle. In this way, the U1-phase and U2-phase windings 686 and 687, which are pitched 180 degrees in the electrical angle, are used to generate the magnetic flux φf2 whose cycles are 720 degrees in the electrical angle.

As described, on the rotor side, the magnetic flux φf2 interlinks with, depending on rotation positions of the rotor, the power reception winding 27 having an electrical angle pitch of 360 degrees, causing a voltage is induced due to electromagnetic induction, The other power reception winding 28 has a phase difference of 180 degrees in the electrical angle from that of the power reception winding 27, thus causing interlinkage of the magnetic flux φf2 with the winding 28 depending on rotation angles of the rotor, but inducing voltage differently from the voltage induced from the winding 27. The power supply current If2 is an AC current, to the generated voltage is also an AC voltage.

The number of turns of the U1-phase and U2-phase windings 31 and 32 can be doubled in order to make the V-phase voltage and the W-phase voltage equal to each other, resulting in balanced voltages, thus being good for the inverter. The values of currents passing through the U1-phase and U2-phase windings 31 and 32 are approximately half of the value of a current passing through each of the V-phase and W-phase windings, the sectional area of each of the windings 31 and 32 can be reduced to half of that of the V-phase and W-phase windings. The total amount of copper wires required for the U-phase is kept almost the same. Winding structures of the respective phases, such as parallel and serial connections thereof, may be changed into other various forms. Each of the foregoing formulas (3) and (4) expresses use of just half of the U-phase current Iu, that is, balanced in both the U1 and U2 phases, but the U-phase current Iu may be unbalanced in both the U1 and U2 phases, through the formula (6) should be reformulated in such a case.

Moreover, the power supply current If2, which is a field power component, is a AC current which has a frequency Ff2 enabling the stator and the rotor to be coupled electromagnetically with each other as can be seen in a transformer. It is preferred that the power supply current If2 be given a rectangular waveform in terms of a simple theory, due to the fact the field current to the rotor is DC. Meanwhile, the time constant of the field winding is larger when this winding is treated as an electric circuit, so that the waveform can be a wine wave or a triangular wave. The frequency can be selected, such as 500 Hz, for example, depending on various factors required by magnetic circuits and drive circuits, and may be set to be variable depending on the rotation speed of the rotor.

During a period of time a flywheel current flows in the field current If in FIG. 3, there occurs a drop in the voltage across the four diodes. To reduce this voltage drop, a diode 3G can be added and connected between both ends of the field winding, as shown in FIG. 3. In this modification, a drop in the voltage of the diodes can be down to an amount corresponding to that of a signal diode.

The field current If is sustained from being from being lowered for a certain period of time, because the flywheel effect thanks to the diodes is provided, whereby the circuit can be simplified in this respect. In contrast, the number of power reception windings may be three, in which a rectifier for the three phases is used. The foregoing full-wave rectifiers 39 and 3B are also changed into another mode, not limited to the full-wave rectifiers 39 and 3B which uses the four diodes. For example, in FIG. 11 described later, the output terminals of the full-wave rectifiers 39 and 3B are connected in series to each other. Depending on coupling characteristics of electromagnetic factors including waveforms of voltage and current which are for supplying field power from the stator side, power supply windings, and power reception windings, diodes can be used or combined in various ways, such as serial or parallel connections of diodes, or use of half-wave rectifiers, whereby the rectifying function can still be realized. In addition, a rectifier equipped with such diodes is fixedly arranged in the rotor, not shown in FIG. 1.

Figure 4:
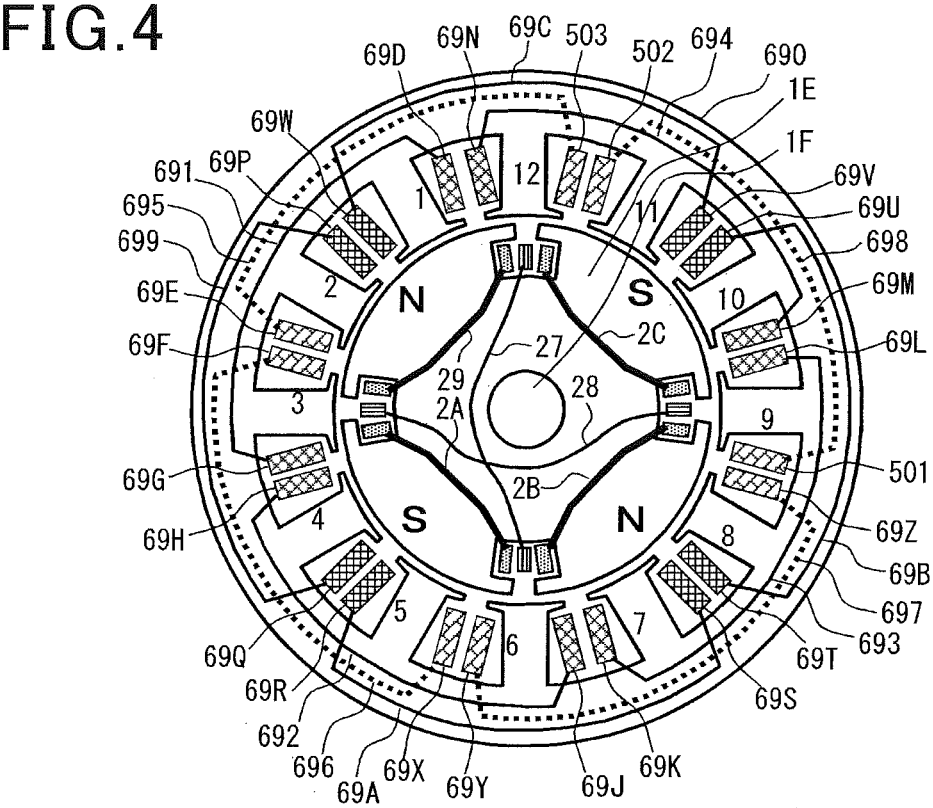
FIG. 4 is a sectional view showing a three-phase four-pole motor according to another embodiment.

FIG. 4 shows a modification of the windings of the motor shown in FIG. 1. A motor shown in FIG. 4 has three phases, four magnetic poles, three-phase full-pitch winding, and two coils accommodated in one slot. A reference numeral 690 shows a stator core. A U1-phase winding is composed of a winding wound from a winding portion 69D to a winding portion 69G and a winding wound from a winding portion 69N to a winding portion 69M. A U2-phase winding is composed of a winding wound from a winding portion 693 to a winding portion 69H and a winding wound from a winding portion 69K to a winding portion 69L. A V-phase winding is composed of a winding wound from a winding portion 69F to a winding portion 69X, a winding wound from a winding portion 69Z to a winding portion 69Y, a winding wound from a winding portion 501 to a winding portion 502, and a winding wound from a winding portion 69E to a winding portion 503.

A W-phase winding is composed of a winding wound from a winding portion 69R to a winding portion 69S, a winding wound from a winding portion 69U to a winding portion 69T, a winding wound from a winding portion 69V to a winding portion 69W, and a winding wound from a winding portion 69Q to a winding portion 69P. This thee-phase motor operates based on currents passing through windings in each slot, in which a sum of such currents in each slot is the same as that shown in FIG. 1, so that equivalent electromagnetic characteristics in the structures shown in FIGS. 1 and 4 are equivalent to each other. The number of windings shown in FIG. 4 is double of that of the windings in FIG. 1, but the total number of the windings are the same in both structures.

Figure 5:
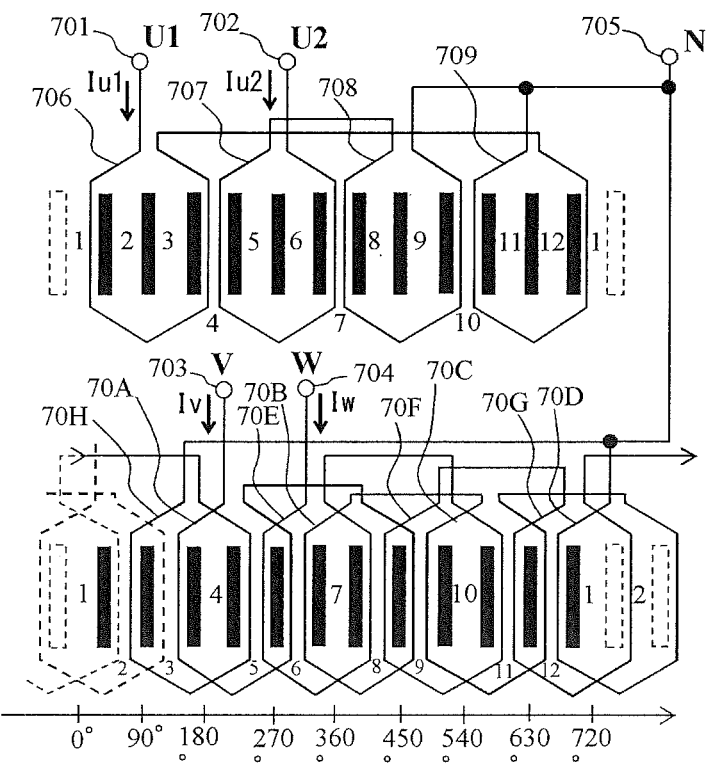
FIG. 5 is a schematic view showing arrangements and connections of a stator windings.

FIG. 5 shows a connection and an arrangement of the windings shown in FIG. 4, in which FIG. 5 is illustrated based on the same manner as that applied by FIG. 2. A reference numeral 701 in FIG. 5 shows a U1-phase winding terminal connected to a hexagonal coil 706 composed of the windings 69D and 69G. The hexagonal coil 706 is connected to one end of another hexagonal coil 709 composed of the windings 69N and 69M in FIG. 4. The other end of this hexagonal coil 709 is connected to a neutral point 705 of a star connection adopted by the stator. Similarly, a reference numeral 702 in FIG. 5 shows a U2-phase winding terminal connected to a hexagonal coil 707 composed of the windings 69J and 69H. The hexagonal coil 707 is connected to one end of another hexagonal coil 708 composed of the windings 69K and 69L. The other end of this hexagonal coil 708 is connected to the neutral point 705. A U1-phase current Iu1 is supplied to the winding terminal 701 and a U2-phase current Iu2 is supplied to the winding terminal 702, with the result that the foregoing formula (1) is realized.

A reference numeral 703 in FIG. 5 shows a V-phase winding terminal connected to a hexagonal coil 70A composed of the windings 69F and 69X, and the hexagonal coil 70A is connected to another hexagonal coil 70B composed of the windings 69Z and 69Y. The hexagonal coil 70B is connected to another hexagonal coil 70C composed of the windings 501 and 502, and the hexagonal coil 70C is connected to one end of another hexagonal coil 70D composed of the windings 69E and 503. The other end of the hexagonal coil 70D is connected to the neutral point 705. A V-phase current Iv is supplied to the winding terminal 703, so that the current Iv is one of the three-phase currents and conforms with the foregoing formula (1).

A reference numeral 704 in FIG. 5 shows a W-phase winding terminal connected to a hexagonal coil 70B composed of the windings 69R and 69S, and the hexagonal coil 70B is connected to another hexagonal coil 70F composed of the windings 69U and 69T. The hexagonal coil 70F is connected to another hexagonal coil 70G composed of the windings 69V and 69W, and the hexagonal coil 70G is connected to one end of another hexagonal coil 70H composed of the windings 69Q and 69P. The other end of the hexagonal coil 70H is connected to the neutral point 705. A W-phase current Iv is supplied, to the winding terminal 704, so that the current Iw is one of the three-phase currents and conforms with the foregoing formula (1).

Referring to FIG. 5, the power supply current If2 shown in the formulas (3) and (4) will now be described in that this current If2 generates a magnetomotive force having which cycle and thus a magnetic flux component having which cycle. Assume that, in the formula (1), the U-phase current Iu is zero and the V-phase and W-phase currents are also zero. In addition assume that, by way of example, the power supply current If2 in the formulas is 2 A (amperes).

A sum of currents supplied for generating field power components in the slot 1 in FIG. 1 is 4 A (amperes) and flows from the upper side to the lower side in FIG. 5. However, in the slot 4, a sum of currents for generating field power components is zero, because the U1-phase and U2-phase currents Iu1 and Iu2 are canceled with each other. A sum of currents passing in the slot 7 is 4 A, and flows from the lower side to the upper side in FIG. 5. By contrast, in the slot 10, a sum of currents is zero, because the U1-phase and U2-phase currents Iu1 and Iu2 are canceled with each other. As a result, the magnetomotive force acts from the rear side to the front side of the paper of FIG. 5 in a range of the slots 1 to 7, generating magnetic flux φf2. A magnetic force acts from the front side to the rear side of the FIG. 5 in a range from the slots 7 to 1 positioned on the right side in FIG. 5, thus generating opposite-directional magnetic flux φf2. The magnetic force and the magnetic flux φf2 are generated at a cycle of 720 degrees in the circumferential direction. Hence, the U1-phase windings 706 and 709 and the U2-phase windings 707 and 708, which are arranged at a pitch of 180 degrees in the electrical angle are used to produce the magnetic flux φf2 generated at a cycle of 720 degrees in the electrical angle.

Figure 6:
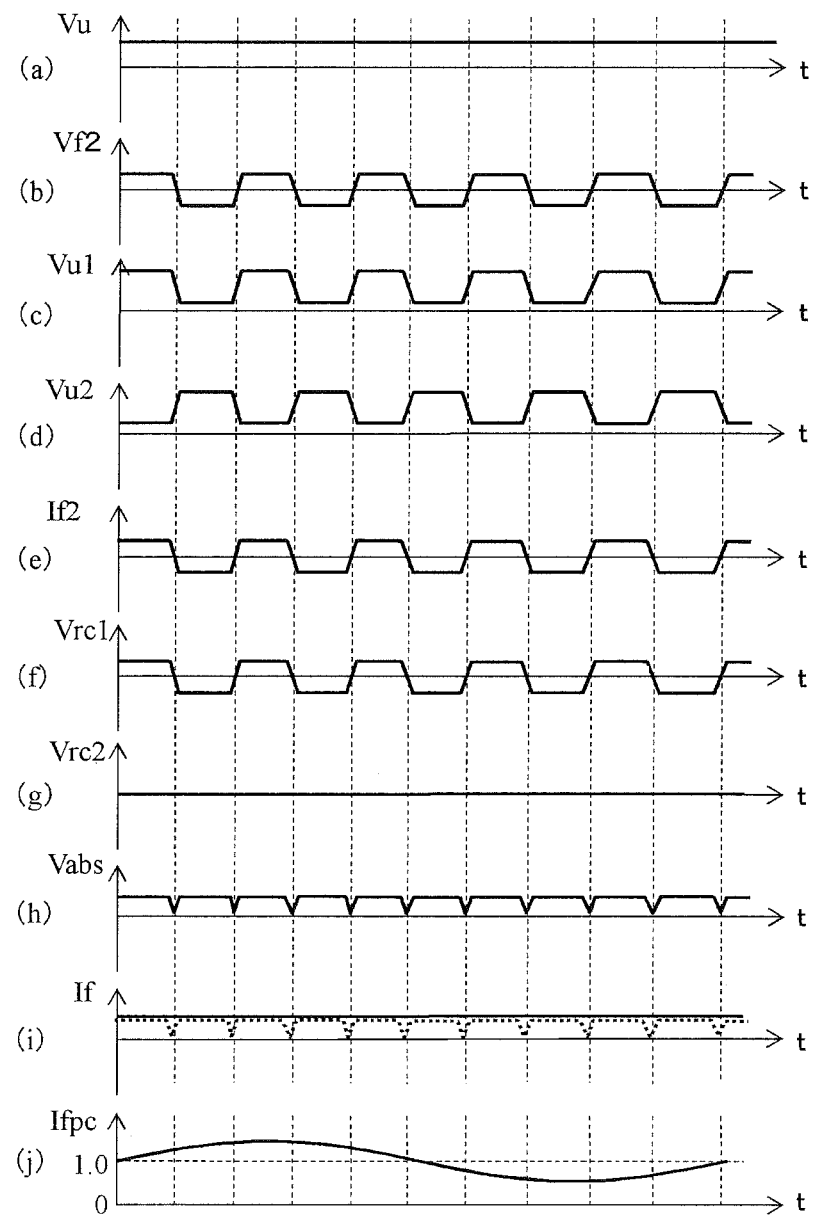
FIG. 6 is a timing chart explaining supply of currents for field power and a flow of field currents.

FIG. 6 exemplifies a time chart explaining how to supply the field current If. In FIG. 6, the lateral axis denotes time, which shows 5 cycles ranging from 0 to 0.01 sec., provided that the frequency of the power supply current If1 is 500 Hz. In practice the motor is powered under control of PWM carried out by the inverter, but in the present description, it is assumed that the voltage and current to the motor is controlled theoretically, not using the PWM control. In FIG. 6, (a) shows a U-phase voltage component Vu, where this component Vu is drawn to be constant because the lateral axis indicates a shorter period of time. FIG. 6(b) shows a powers-supply voltage Vf2 to supply a field current, where the voltage Vf2 is shown as a trapezoidal shaped voltage of a frequency of 500 Hz. FIG. 6(c) shows a U1-phase voltage Vu1, which is expressed as a sum of the U-phase voltage competent Vu and the power-supply voltage Vf2 is applied to the U1-phase winding 31 shown in FIG. 3. FIG. 6(d) shows a U2-phase voltage Vu2, which is a difference between the U-phase voltage component Vu and the power-supply voltage Vf2 and is applied to the U2-phase winding 32 shown in FIG. 3. FIG. 6(e) shows a power supply current If2 which corresponds to the current component indicated by the reference numeral 3G in FIG. 3. By these currents and voltages, the foregoing formulas (3), (4), (5) and (6) are met.

Under this current and voltage control, the rotor of the motor shown in FIGS. 4 and 5 operates as follows. When the rotation position of the rotor is such that the slots 1 and 7 shown in FIG. 5 are opposed to the power reception winding 27 of the rotor shown in FIG. 4, magnetic flux generated by the power supply current If2 interlinks with the power reception winding 27, thus a voltage Vrc1 shown in FIG. 6(f) being generated. At this time, there is a phase difference of 180 degrees in the electrical angle between the power reception windings 28 and 27, a total of magnetic fluxes including interlinkage of the magnetic flux generated by the power supply current If2 is just zero. Hence, voltage caused by the power reception winding 28 is almost zero, as shown by Vrc2 in FIG. 6(g).

When the rotor is rotated from the current rotation position, the amplitude of the voltage Vrc1 decreases but the amplitude of the voltage Vrc2 increases in synchronization with the rotation positions as the rotation advances. When the rotation of the rotor advances to reach a position of 180 degrees in the electrical angle, the voltage Vrc1 becomes zero, while the voltage Vrc2 which has been zero becomes a maximum as shown in FIG. 6(f). In this way, the rotation positions of the rotor, at either the power reception winding 27 and the power reception winding 28, the voltage is generated responsively to reception of the power supply current If2. The power reception windings 27 and 28 are arranged at a winding pitch of 360 degrees in the electrical angle, resulting in that the magnetic flux components for the three phases (U-, V- and W-phases) are canceled with each other, thus no magnetic flux appearing on the power reception windings 27 and 28.

The voltage Vrc1 is rectified into a DC voltage by the full-wave rectifier 39 shown in FIG. 3, while the voltage Vrc2 is rectified into a corresponding DC voltage by the full-wave rectifier 3B shown in FIG. 3. The outputs of both the full-wave rectifiers 39 and 3B are superposed on one the other and applied to the field windings 3C, 3D, 3E and 3F, so that the field current If shown in FIG. 6(i) is supplied thereto. Since the field circuit composed of the full-wave rectifiers and the field windings has a larger time constant, such as approximately 100 msec, the field current If can have a waveform sufficiently smoothed even when there is a pulsative voltage component whose frequency is double of 500 Hz shown by a dashed line.

The power reception winding 27 can be deformed depending on difficulties of manufacturing and/or rotor configurations. For example, the field winding 27A wound parallel with the field winding 29 shown in FIG. 4 and the field winding 27B wound parallel with the field winding 2A shown in FIG. 4 may be connected in series to each other so as to produce the power reception winding 27. Though each of the wield windings 27A and 27B is wound at a pitch of 180 degrees in the electrical angle, the serial connection of these windings 27A and 27B becomes interlinkage of magnetic flux which is within an electrical angle range of 360 degrees, thus being equivalent to the foregoing electromagnetically.

In FIG. 3, the U1-phase winding 31 and the U2-phase winding are connected parallel to each other, whilst the V-phase windings 33 and 34 are connected in series to each other and the W-phase windings 35 are connected in series to each other, thus being imbalanced among the phases. To compensate for this imbalance, the U1-phase winding 31 and that of the U2-phase winding 32 are doubled in the number of windings compared to the V-phase windings 33 and 34 (and the W-phase windings 35 and 36). In contract, the sectional area of each winding for the U1- and U2-phases is reduced to ½ of that for the V and W-phases. After all, the total amount of copper wires for the U-phase is kept almost the same as that for the other phases. When, in the configuration shown in FIG. 3, the V-phase windings 33 and 34 are connected parallel with each other and the W-phase windings 35 and 36 are connected parallel with each other, the U-phase winding 31 and the U2-phase winding 32 can be the same in the number of winding as those of the U1- and U2-phases, whereby the relationship of the formula (2) is still maintained.

In a three-phase concentrated-winding motor, the U-, V- and W-phase windings are wound at a winding pitch of 120 degrees in the electrical angle, but the winding cycles are 360 degrees in the electrical angle. Even in this case, the winding configuration shown in FIG. 3 can be realized. In this way, the winding pitch of power supply windings depends on the number of phases of a motor, the number of magnetic poles, a winding type, or other factors. The winding cycle of power supply windings may not be 360 degrees in the electrical angle and there is no specific restriction for the winding pitch of the power supply windings. At least, as long as the power reception windings are wound at a winding pitch equivalent to the integral multiple(RN times) of 360 degrees in the electrical angle, there is no effect of motor drive currents such as three-phase currents. The vale of RN for the winding pitch of the power reception windings can be selected in accordance with the number of phases for the power supply windings, the number of magnetic poles, the winding type and other factors of a motor being driven. In addition, even if the winding pitch and the winding cycle of the power supply windings and power reception windings depart, to a certain extent, from the principles therefor, the advantages of the present invention can be provided, so that it should be construed that the present invention can be practiced even in such an case.

In the power supply and power reception of the field power explained in FIGS. 1 to 6, the power is transmitted from the stator side to the rotor side based on the theory of a transformer. The AC power transmitted to the secondary side is rectified to be applied to the field windings 3C, 3D, 3E and 3F as the field current If. Hence, the power for only resistive loss in the field winding, which is required on the rotor side, can be supplied effectively. In the stator, the power supply current If2 is sufficiently smaller in amplitude than the phase currents, whereby reactive currents are less in the motor.

In the conventional general-purpose synchronous motor, the field currents supplied to stator windings, that is, a d-axis current which is a reactive current, is supplied for controlling field magnetic fluxes. As described, when a larger amount of torque is outputted, reactive currents may rise so as to lower a power factor down to approx. 0.6. At this moment, there is caused a phase difference −53.13 degrees of in the currents and a copper loss rises up to an amount which is 2.777 times (=1/(0.6×0.6)). According to the present invention, most of this increased loss can be reduced, provided that the power reception windings and field windings are wound in the rotor. As a whole, the motor can be made in more compact size and produced in lower cost.

Further, in the configuration of the present invention, the field current component If2 can be controlled precisely by the inverter, so that the field current If can be controlled in a precise manner as well. There is therefore a great advantage of freely controlling the field to either a slightly larger amount or a lightly lower amount than the current value. Additionally this control can be realized with lesser dependency on both rotation positions and rotation speeds of the rotor.

Furthermore, it is possible to superpose the d-axis current on the field current, and as will be described later, permanent magnets can be utilized in the configuration for supplying the field current, Hence, it is possible to produce field magnetic fluxes by combining the field current If, the d-axis current, and a magnetomotive force generated by the permanent magnets. The combined field magnetic fluxes can be controlled in its balance among the flux components, so that this controllable balance results in elaborated motor design which meets various needs.

[Second Embodiment]

The structure of another rotor according to the present invention will now be described.

The rotor can be configured as various types of structures, from a simple structure with produced magnetic poles as shown in FIG. 1 to a complex structure in which permanent magnets are arranged in a complex manner. A rotor shown in FIG. 7 has rotor magnetic poles in which of which slit-shaped air gaps 83, when viewed in sections, are formed. In the rotor, a reference numeral 81 shows an N-magnetic pole and a reference numeral 82 shows an S-magnetic pole. In each of the rotor magnetic poles, magnetic flux components which interact with the stator pass through narrow magenta paths 84 each being between the air gaps 83. A reference numeral 85 shows a bridge portion located on the outermost periphery of the rotor, while a reference numeral 86 shows a bridge portion arrange in a middle part of each of the slits. The bridge portions are required to provide a sufficient strength to the rotor. There are also power supply windings 1H and 1P, and 1L and 1S which are the same in configurations to those shown in FIG. 1. Similarly, field windings 1J, 1K; 1M, 1Z; 1Q, 1R; and 1T, 1G are the same in configurations to those shown in FIG. 1.

Figure 7:
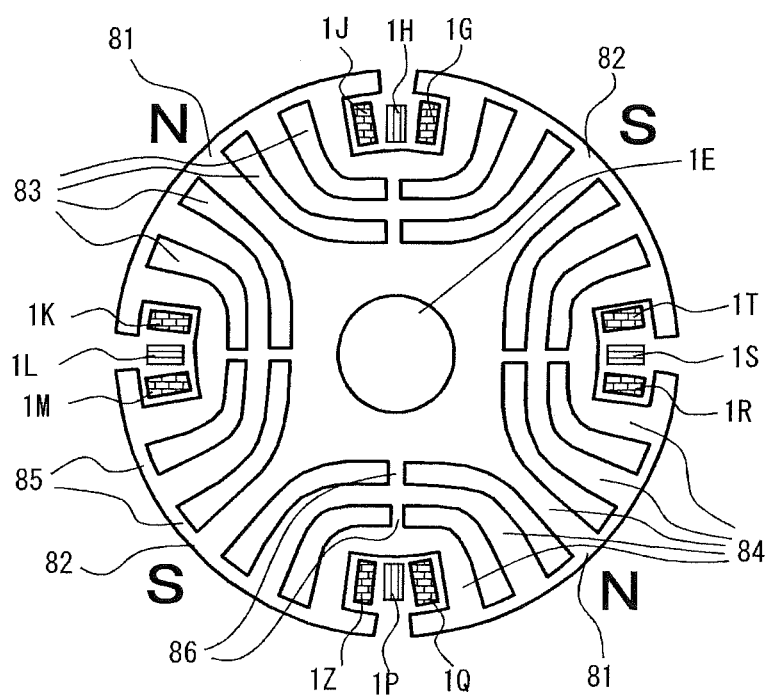
FIG. 7 is a sectional view showing a four-pole motor according to another embodiment.

When torque currents are supplied to the windings of the stator in a state where field magnetic fluxes have been produced in the respective magnetic poles shown in FIG. 7, magnetomotive forces due to an armature reaction act in the circumferential direction of the respective rotor magnetic poles, whereby magnetic flux components are produced in the circumferential direction. In this action, the slit-shaped air gaps 83 magnetically act against the magnetomotive forces, thus reducing the magnetic flux components caused in the circumferential direction, thus being advantageous for preventing the power factor from being lowered.

Alternatively, in order to reduce the armature reaction of the torque currents, permanent magnets can be additionally arranged in the slits, where the arranged permanent magnets are given polarities which generate magnetic flux directed against the magnetomotive forces. Additionally, for the purpose of enhancing motor strength and reducing motor vibration, non-magnetic material such as resin material can be filled in the air gaps 83. In FIG. 7, the radially outermost side of slots, where the power supply windings and the field windings are accommodated, are open, but this radially outermost side may be closed, thus raising the motor strength. In such a closed structure, the rotor windings cannot be inserted into the respective slots, but it is possible to employ another insertion ways such as axial insertion of the windings into the respective slots.

An embodiment according to claim 3 will now be described. FIG. 9 shows an enlarged view of an upper left part of the rotor shown in FIG. 8. Compared with the structure shown in FIG. 7, permanent magnets 191, 192, 193 and 194 are additionally arranged the respective radially outer ends of slit-shaped air gaps 201. These permanent magnets are magnetized in the directions which are in accord with the magnetic directions of the respective magnetic poles of the rotor. For example, the permanent magnets 191, 192, 193 and 194 are place to have S poles on the radially inside and N poles on the radially outside. These permanent magnets can excite in the directions of the rotor magnetic poles, so that the exciting magnetic fluxes have, electromagnetically, a serial relationship with magnetic fluxes excited by the field currents passing through the field windings such as field windings 1J, 1K and 1M, 1Z. For example, magnetic fluxes passing through a slender magnetic path 203 formed between mutually adjacent air gaps 201 are transmitted to the stator via the two permanent magnets 192 and 193.

Figure 8:
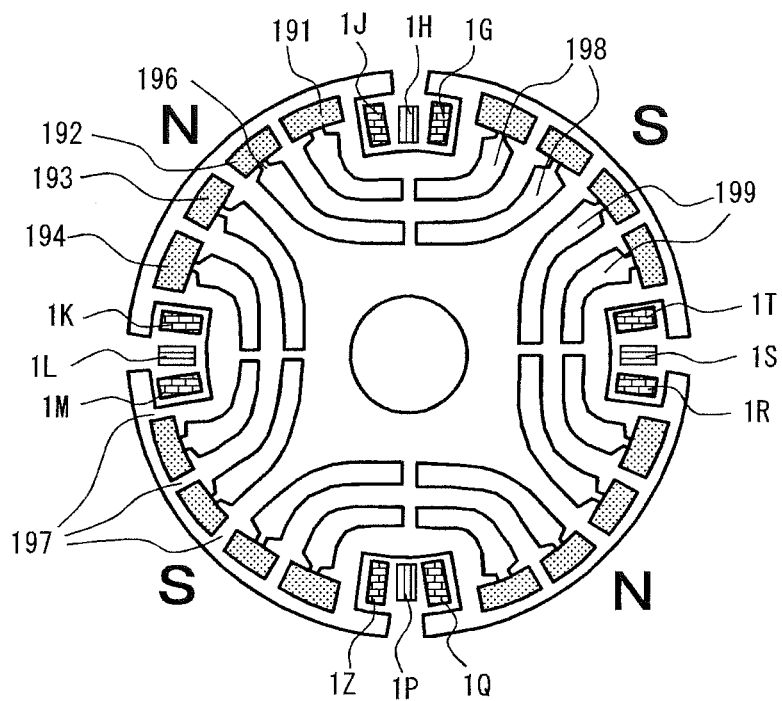
FIG. 8 is a sectional view showing a four-pole motor according to another embodiment.
Figure 9:
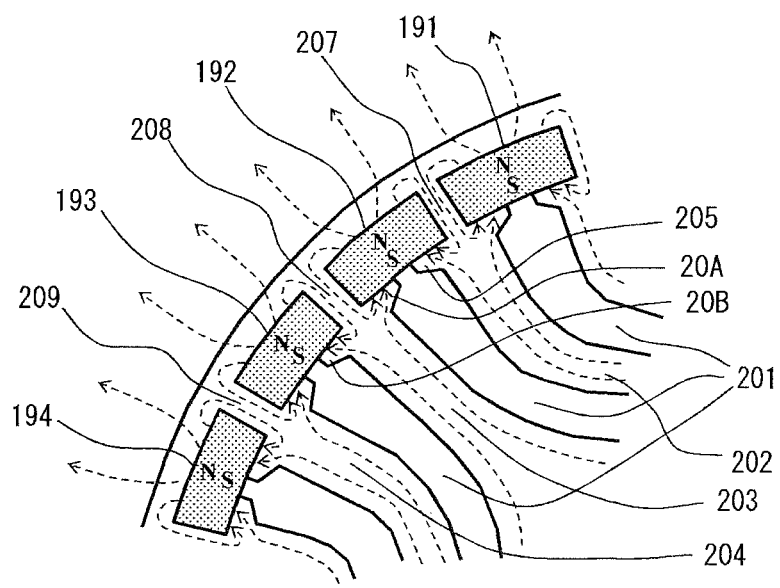
FIG. 9 is a partial sectional view exemplifying a four-pole rotor.

The rotor shown in FIGS. 8 and 9 are provided to produce the field magnetic fluxes by effectively utilizing permanent magnets, make it possible that the rotor has a higher strength and can rotate at higher speeds, and avoid influence of the armature reaction due to the stator currents as much as possible. The magnetic fluxes which have passed through the foregoing magnetic path 203 are guided by enlarged portions 20A and 20B of the magnetic path as shown by dashed lines and transmitted to the stator via the permanent magnets 192 and 193. The enlarged portions 20A and 20B widens the path, so that this widened path allows the magnetic fluxes to pass through easily. On the other hand, in order to keep the strength of the periphery of the rotor to resist a centrifugal force, it is required that a circumferential width MGW of the bridge portion 208 located between the permanent magnets 192 and 193 is kept sufficiently. Leakage fluxes of permanent magnets, which are shown by dashed lines, pass through a bridge portion 208 so as to flow from the N pole to the S pole, which are reactive magnetic fluxes having no electromagnetic influence on the stator. Hence, it is required that the bridge portion 208 be magnetically saturated by the leakage fluxes passing therethrough. The circumferential direction MGW of each of the bridge portions should be smaller as much as possible. This is also true of the other bridge portions 207 and 209.

If the circumferential direction MGW is too larger, the magnetic fluxes from each permanent magnet pass from its N pole to its S pole by way of the bridge portion 208, thus mostly spoiling operational effects of the permanent magnet. For instance, when the permanent magnets 192 and 193 emit fluxes whose a magnetic flux density corresponding to 0.7 T and the circumferential width MGW of the bridge portion 208 is approx. ⅓ of the circumferential width of the permanent magnet, the operational effects of the permanent magnet is are few, because the magnetic steel sheet has a saturation flux density of approx. 2.0 T. Additionally, because of poor magnetization or others, it is difficult to have the permanent magnet worked well in such a condition. Hence, the circumferential width MGW should be lower as much as possible, e.g., an ⅕ or less. It is also required that the circumferential width MGW of the bridge portion 208 be ½ or less of the circumferential width of the foregoing slender magnetic path 203 in terms of practical design.

As a gap between the enlarged portions 20A and 206 become smaller, the amount of circumferential leakage fluxes increases due to the armature reaction of the stator currents. It is therefore desired to give the gap a minimum distance. However, when it is desired to arrange, in the slit-shaped air gaps 201, permanent magnets which prevent the armature reaction, there can be provided no gap between the enlarged portions 20A and 20B such that parts of those portions 20A and 20B are coupled with each other to give priority to strengthen the rotor. Provided that the rotor is given a strength which can bear the centrifugal force, the permanent magnets 191, 192, 193 and 194 may be formed such that these permanent magnets are partially coupled with each other in the circumferential direction.

Figure 10:
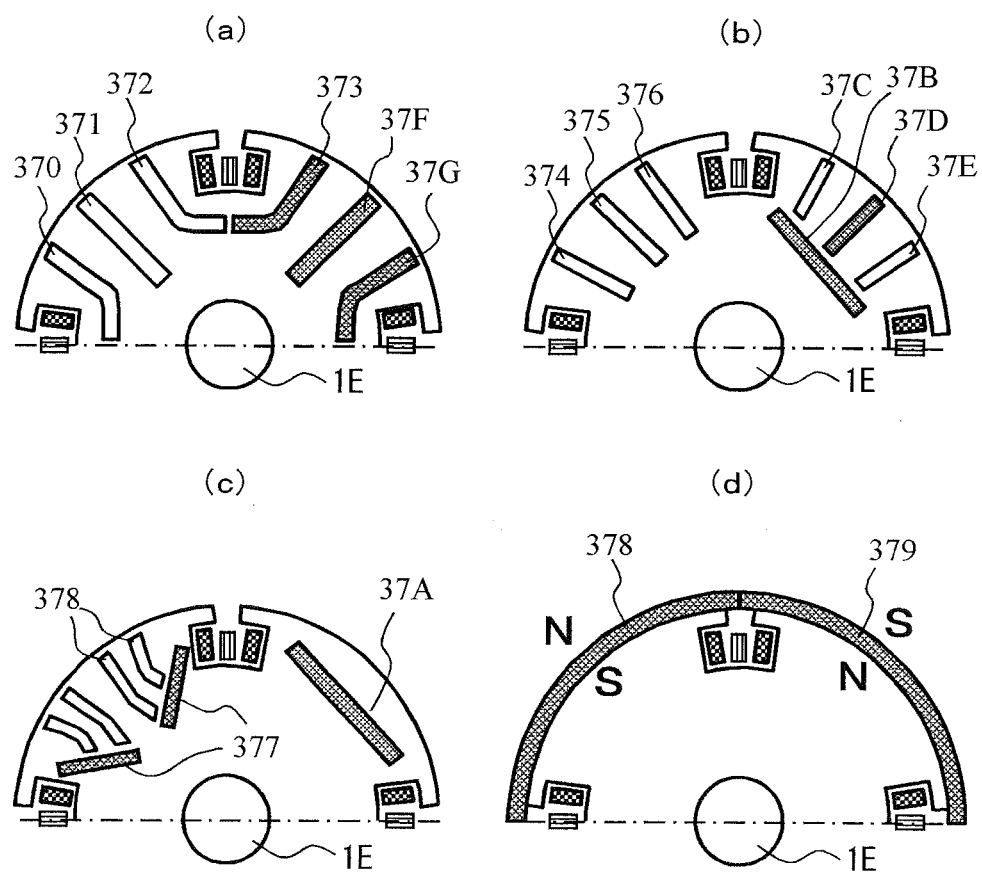
FIG. 10 is a sectional view exemplifying another four-pole rotor.

The rotor according to the present invention can also be developed into other forms, as shown in FIG. 10. FIG. 10 is drawn in such a manner that only a semicircular section of each rotor is shown, where FIGS. 10(a), 10(b) and 10(c) show rotor shapes a quadrant section of each rotor. In FIG. 10(a), there are provided slender slits 370, 371, 372, 373, 37F and 37G. Of these slits, each of the slits 370, 372, 373 and 37G is elongated and bent to almost be connected an adjacent magnetic pole in the rotor, while the slits 371 and 37F only radially extend from the rotor outer surface side toward a central part of the rotor. This rotor structure can enhance parts of the rotor strength which are close to the slit 371. Further, permanent magnets are incorporated in the slits 373, 37F and 37G to suppress the armature reaction, in which the directions of the N or S poles of such permanent magnets are directed toward the circumferential direction.

In FIG. 10(b), there are provided slits 374, 375 and 376 in a left-side quadrant section of a rotor, which radially extend from the rotor surface side toward a rotor central part. When it is assumed that a d-axis is assigned to a rotor pole direction in which the slit 375 is oriented, there can be provided an effect which shields magnetic fluxes in the q-axis in positions close to the rotor surface. Meanwhile, there is no such effect in the rotor central part, due to non-existence of such slits, but instead, the strength of the rotor can be secured fully. In the rotor structure of which right-side quadrant section shown in FIG. 10(b), there is a permeant magnet 37B added to slits 37C, 37D and 37E. This is helpful for equally supplying magnetic fluxes from the magnet to the surface of the rotor magnetic poles. As shown by the slit 37D, a permanent magnet may be embedded in the slit.

In a rotor structure of which left-side quadrant section shown in FIG. 10(c), there are slits 378 and permanent magnets 377. A soft-iron portion is formed in a central part of each rotor magnetic pole, where magnetic fluxes from an electoral magnet caused by the field current are easier to pass through. The rotor structures shown in FIGS. 10(b) and 10(c) are the same as the motor structure described with FIG. 9 in that the permanent magnet(s) and the magnetic paths in the rotor are magnetically linked in series. Additionally, the permanent magnets are arranged inside the rotor, thus being able to resist a demagnetization effect.

The rotor which right-side quadrant section shown in FIG. 10(c) is structured to supply magnet mergence fluxes toward the rotor magnetic poles. In a rotor shown in FIG. 10(d), there is provided a ring-shaped or pipe-shaped permanent magnet is arranged on and along the rotor periphery. In particular, in compact motors, a circular magnet is widely used which is formed by mixing a rare-earth magnet with resin material and then solidifying the mixed materials. The thus-produced magnet itself is higher in strength, but can be fixed to the rotor using an adhesive to further raise the strength. A part 378 of this permanent magnet is magnetized to as N pole, while a part 379 thereof is magnetized as an S pole. Both the magnetic fluxes from this permanent magnet and the magnetomotive force from the field windings can be mixed with each other so that the field currents in the rotor can be raised or lowered selectively, whereby the fields in the rotor can be controlled.

Incidentally, the field windings 1J, 1K, 1M, 1Z, 1Q, 1R, 1S and 1G are pictorially illustrated in FIG. 1 in such a manner that those sectional areas are drawn in a smaller size. However, exciting the field magnetic fluxes requires a reasonable ampere-turn amount, so that the sectional areas inevitably become larger. Meanwhile, the other power reception windings 1H, 1P, 1L and 1S correspond to the secondary winding of a transformer, so that power required for the field excitation is relatively smaller, because it is sufficient that such power is just for resistive loss in the field production, and the sectional areas of the power reception windings can be kept smaller.

[Third Embodiment]

An embodiment according to claim 4 will now be described. The present embodiment provides a motor provided with permanent magnets. In this motor, magnetic characteristics of part of the permanent magnets are controlled by a magnetomotive force generated from stator windings. When the intensity of magnetic fluxes of the magnets can be controlled, the field currents may not be used or may be reduced, thus reducing a copper loss in the motor. Currently it is difficult to control arbitrarily the intensity of magnetic fluxes of permeant magnets during drive of a motor. However, if part of the permanent magnets is made of a material whose magnetization and demagnetization are easier or made into a thin shape, the intensity of magnetic fluxes is controllable by controlling stator currents, whereby an average of magnet performance of the whole motor can be changed. If a part of the magnets is higher in magnetic characteristics, the characteristics are difficult to be changed. In contrast, if a part of the magnets is lower in magnetic characteristics, magnetized states of the part can be changed. For example, in FIG. 8, the permanent magnets 191 and 194 of the rotor are produced as rare-earth magnets whose coercive force is higher, while the permanent magnets 192 and 193 are produced as alnico magnets whose coercive force is lower. Supplying a d-axis current the stator windings results in selectively weakening or strengthening the magnetic characteristics of the alnico magnets 192 and 193. In FIG. 10(*d*), the thicknesses of the permanent magnets 378 and 379 can be thinned locally, so that the thinned portions provides controlled magnetic characteristics.

[Fourth Embodiment]

Figure 11:
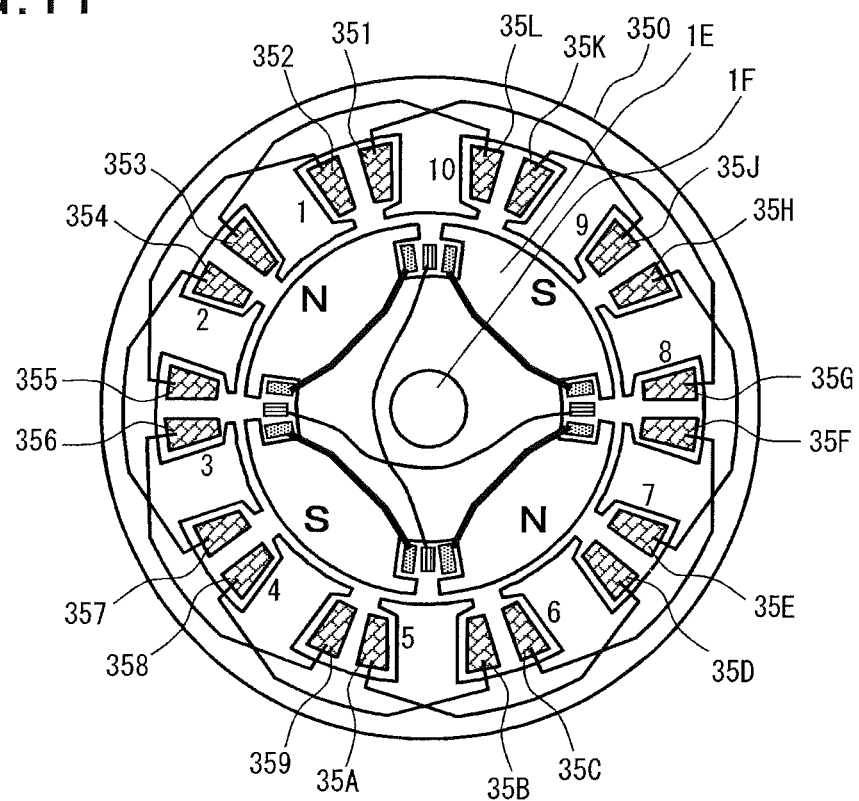
FIG. 11 is a sectional view exemplifying a five-phase four-pole short-pitch-winding motor.

An embodiment according to claim 5 will now be described. FIG. 11 shows a five-phase short-pitch-winding motor, in which the number of poles is 4, the number of slots is 10 and the winding pitch is 144 degrees. A reference numeral 350 shows a stator core having 10 slots. When the electrical angles of this motor range from 0 to 720 degrees, there are provided A1-phase windings 352 and 355 wound in slots whose electrical angles are 0 and 144 degrees respectively, a B-phase windings 354 and 357 wound in slots whose electrical angles are 72 and 216 degrees respectively, C-phase windings 356 and 359 wound in slots whose electrical angles are 144 and 288 degrees respectively, D-phase windings 358 and 35B wound in slots whose electrical angles are 216 and 360 degrees respectively, E-phase windings 35A and 35D wound in slots whose electrical angles are 288 and 72 degrees respectively, A2-phase windings 35C and 35F wound in slots whose electrical angles are 360 and 504 degrees respectively, B-phase windings 35E and 35H wound in slots whose electrical angles are 432 and 576 degrees respectively, C-phase windings 35G and 35K wound in slots whose electrical angles are 504 and 648 degrees respectively, D-phase windings 35J and 351 wound in slots whose electrical angles are 576 and 720 degrees respectively, and E-phase windings 35L and 353 wound in slots whose electrical angles are 648 and 72 degrees respectively, The five-phase motor shown in FIG. 11 features that the stator windings are wound using the short-pitch winding method and the winding pitch is 144 degrees in the electrical angle. It is thus possible to reduce intersections of windings of different phases at coil end portions, thus simplifying the winding structure of the coil end portions. The convectional full-pitch-winding five-phase motor provides good performance in the electromagnetic theory, but the winding intersections at the coil end portions are badly complicated, so that this motor has been practiced in only specific limited applications. In contrast, the five-phase motor shown in FIG. 11 employs the A1- and A2-phase windings and, in the same way as the motors shown in FIGS. 1 and 4, the field current If can be supplied. In the three-phase motor is allowed to utilize only ⅔ of windings on average because there is a restriction derived from the 3-terminal circuit network. By contrast, since the five-phase motor composes a 5-terminal circuit network, ⅘ of the windings can be utilized on average. If the three-phase and five-phase motors are driven by sine-wave drive signals, there is no difference in the motor efficiency between the motors in terms of theory. However, the drive signals (voltages and currents) for each phase are rectangular or trapezoidal waveform signals, the efficiency of the five-phase motor can be higher than that of the three-phase motor.

According to a simple calculation in this condition, compared to the three-phase motor, the five-phase motor provides a rate of utilization of (⅘)/(⅔)=1.2, so that, for example, a copper loss can be recued by approximately 20%.

[Fifth Embodiment]

Figure 12:
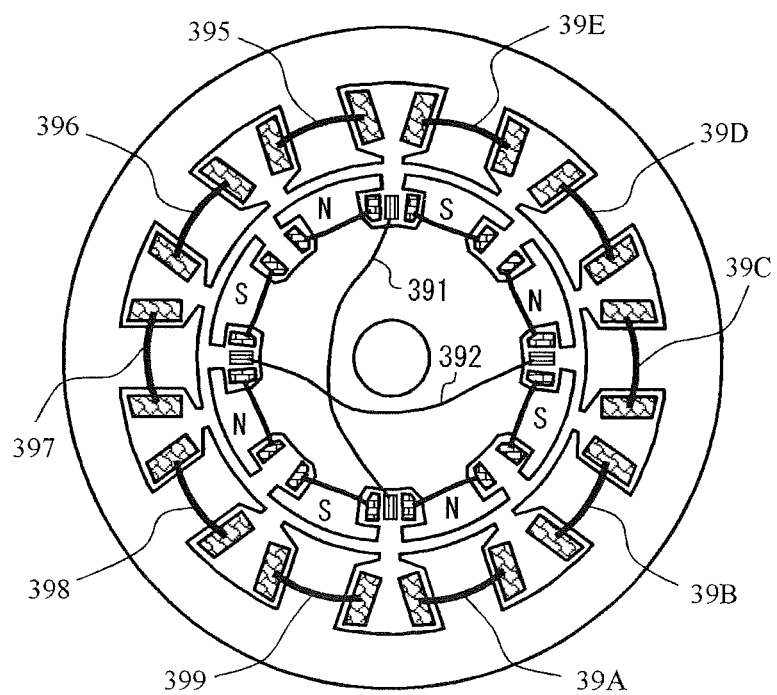
FIG. 12 is a sectional view exemplifying a five-phase four-pole concentrated-winding motor.
Figure 13:
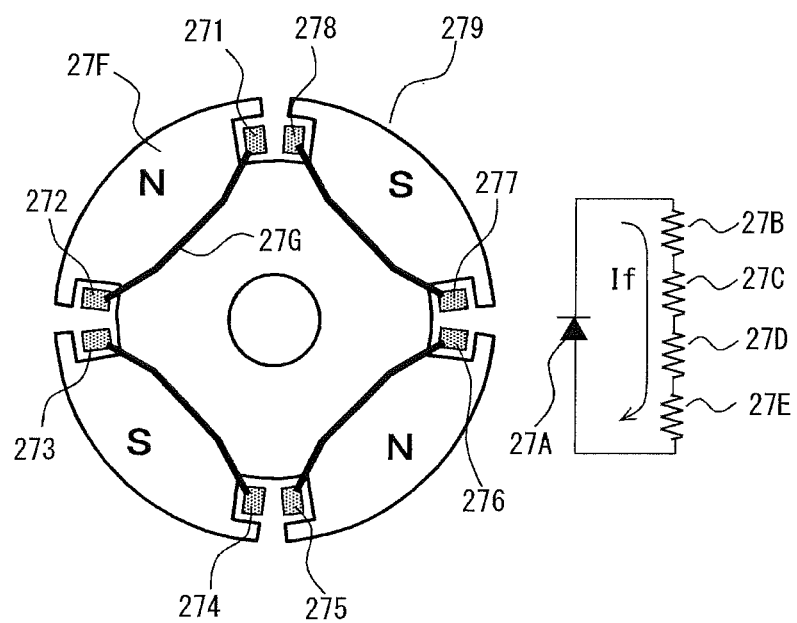
FIG. 13 is a view exemplifying a conventional four-pole rotor.

An embodiment according to claim 6 will now be described. FIG. 12 shows a five-phase concentrated-winding motor, in which the number of poles is 8, the number of slots is 10 and the winding pitch is 144 degrees. When the electrical angles of this motor range from 0 to 1440 degrees, there is provided a A1-phase winding 395 wound in slots at electrical angles 0 and 144 degrees, a C-phase winding 396 wound in slots at electrical angles 144 and 288 degrees, a E-phase winding 397 wound in slots at electrical angles 288 and 432 degrees, a B-phase winding 398 wound in slots at electrical angles 432 and 576 degrees, a D-phase winding 399 wound in slots at electrical angles 576 and 720 degrees, a A2-phase winding 39A wound in slots at electrical angles 720 and 864 degrees, a C-phase winding 39B wound in slots at electrical angles 864 and 1008 degrees, a E-phase winding 39C wound in slots at electrical angles 1008 and 1152 degrees, a B-phase winding 39D wound in slots at electrical angles 1152 and 11296 degrees, and a D-phase winding 39E wound in slots at electrical angles 1296 and 1440 degrees. The order of the five-phase AC is the A-phase, B-phase, C-phase, D-phase and E-phase in the circumferential direction, but the windings are not wound in the this phase order in the circumferential direction. Power reception windings 391 and 392 are wound at a winding pitch corresponding to 720 degrees in the electrical angle, so that these windings have, relatively to each other, a phase difference of 360 degrees in the electrical angle. Field windings are wound at the eight-pole rotor magnetic poles, and connected in series to each other.

The features of the five-phase motor shown in FIG. 12 are the concentrated windings, the winding pitch is 144 degrees in the electrical angle which is larger moderately, and a lager winding factor of 0.95. The concentrated-winding motor is advantageous in various factors such that the concentrated-winding motor is easier in producing the windings, has shortened coil end lengths of the windings, has a higher space factor of the windings, and is easier in automatically winding the windings at higher speeds. Hence, the motor can have high performance and can be manufactured in compact in size and at lower cost. However, in the conventional concentrated-winding, it has been difficult to control the field magnetic flux to its slightly lower values or slightly higher values by using the d-axis current, which is similar to the difficulty of the full-pitch-winding five-phase motor. However, the five-phase motor in FIG. 12 employs the A1-phase and A2-phase windings, whereby the field current If can be supplied in the same way as the motors shown in FIGS. 1 and 4. In other words, the field current controlled from the stator side, so that the motor can be driven at a larger amount of torque in a lower rotation speed range and can also be driven in higher rotation speeds, thus widening the drive range, thus realizing both requirements.

[Sixth Embodiment]

An embodiment according to claim 7 will now be described. In this embodiment, for example, a power supply winding PSWS for powering a field is added between the slot 1 equipped with the winding 69D embedded therein and the slot 7 equipped with the winding 69J embedded therein in the motor configuration of FIG. 4. The foregoing power supply current If2 is supplied to this power supply winding PSWS, resulting in that, in the same manner explained in the embodiment of FIG. 4, the power reception windings 27 and 28 can be powered, and the powered voltage is rectified to supply a field current If to the field windings 29, 2A, 2B and 2C. In this case, it is not required to supply field power to the U1-phase windings 69D, 69G and 69M, 69N, and the U2-phase windings 69H, 69J and 69K and 69L, so that the U1-phase and U2-phase windings are connected in the same way as the V-phase and W-phase windings.

The power supply winding PSWS is wound at a circumferential pitch of 360 degrees in the electrical angle, namely wound at a winding cycle of 720 degrees. In other words, when a variable QN=2, AC magnetic flux components are magnetically excited at a cycle amounting to QN times of 360 degrees in the electrical angle. The power supply current If becomes positive and negative at a pitch of 360 degrees in the electrical angle, thus theoretically resulting in cancellation of generated torque, thus lesser influencing the motor torque. This is the same as those explained with FIGS. 1 and 4. Incidentally, it is required to have a drive circuit dedicatedly powering the power supply winding PSWS with the power supply current If2, and this drive circuit can be configured to use two pairs of half-bridge circuits composed of IGBT shown in FIG. 3. The power supply current If2 can be kept at smaller values, so that load to the circuit is smaller. The arrangement position and winding pitch of this power supply winding PSWS are not restricted to the foregoing ones, and can be modified to other forms such as divided plural windings. This power supply winding PSWS may be arranged in the five-phase motors shown in FIGS. 11 and 12.

[Seventh Embodiment]

An embodiment according to claim 8 will now be described. In this embodiment, the motor controller 3X is configured to variably control the amplitude of the power supply current If2 in a lower frequency Fpos, which makes the amplitude of the power supply current If2 variable. For example, assume that the frequency of the power supply current If2 is 500 Hz and the frequency Fpos is 20 Hz. The field current Ifpc thus increases or decreases as shown in FIG. 6(*j*) and the field magnetic fluxes φf increases or decreases in proportion to the field current Ifpc. The lateral axis denote time in FIG. 6 and a range from the left end to the right end in FIG. 6(*j*) corresponds to 0.05 sec. In this case, when the rotor is stationary, voltages are induced across the windings for the respective phases depending on an increase and a decrease in the field magnetic fluxes φf, so that the rotor pole positions can be detected using the induced voltages.

A main-machine motors for electric vehicles requires sensor-less position detection and activation from its stationary state in a lower rotation speed range providing higher amounts of torque. If a difference between impedance values in the d- and q-axes, the above requirements are met. When the rotor periphery is made of a soft magnetic material as shown in the motor according to the present invention or when rotor portions next to its rotor surface are magnetically saturated by a larger amount of current, the impedance difference is smaller if the rotor configuration shown in FIG. 10(*d*) is adopted. Both sensor-less detection ways of rotor rotation positions, which are respectively based on the impedance difference and the induced voltages during the rotor rotation, can be performed at the same time.

As described, the present invention has been described based on various configuration, but may be modified into variety of other modes, application, and/or combinations. For example, the foregoing embodiments have been explained such that the foregoing power supply windings are wound at a winding cycle which is two times or more, but an integer multiple, of 360 degrees in the electrical angle. But this winding pitch is not limited to the integer multiple, but may be set as approximate pitches which still provide the foregoing effects to some extent. The winding pitch of the power reception windings may also be set as approximate values close to an integer multiple of an electoral angle of 360 degrees, which also provides the foregoing effects to some extent. The foregoing four-pole motor can be changed to for example eight poles, in other words, the number of poles can be changed to another value. The serial or parallel connections of the phase windings shown in the foregoing figures can also be changed or combined appropriately. The present invention can be practiced in distributed-winding motors. The number of phases may be 2, 4, 6, or 7 for example. A first motor may be arranged in a radially outer position and a second motor may be arranged in a radially inner portion, so that the two motors are arranged in a unified one motor configuration. In a motor configuration in which a first rotor is arranged in a radially outermost position, a second rotor is arranged in a radially innermost position, and first and second stators are arranged in a radial position between the first and second rotors, the windings of the first and second stators are mutually connected to produce toroidal windings. In this case, structures of the coil end portions can be simplified largely. It is also possible to apply the present invention to a motor in which a stator and a rotor are opposed to each other in the rotor shaft direction, which is also called axial gap moto, or a stator and a rotor are combined in a conjugated manner. As another type of the windings, aluminum wires may be used. As the soft magnetic material, other materials, such as powder magnetic core, can be adopted, not limited to the magnetic steel sheets. It is also additionally arrange an apparatus dedicated for magnetization, demagnetization, and/or degauss for the permanent magnets. Combinations or changes of the foregoing modifications are still within the scope of the present invention.

What is claimed is:

1. A multiple-phase AC electric motor provided with four or more poles; comprising:

a stator:
stator windings SSW wound around the stator and configured to receive multiple-phase currents:
a rotor arranged to be opposed to the stator via a gap and configured to be rotatable, the rotor having N and S magnetic poles:
power supply windings PSW configured as, at least, a part of the stator windings SSW and arranged at a pitch corresponding to QN-times of an electrical angle of 360 degrees in a circumferential direction of the stator, wherein the QN is a variable of 2 or more, wherein the power supply windings PSW are configured to receive power supply currents Ipsw whose frequency ffm is different from a frequency fac of the multiple-phase currents, the power supply currents being superposed on the multiple-phase currents;
a first power reception winding PRW1 arranged at the rotor, wherein the first power reception winding PRW1 is arranged at circumferential positions of the rotor at a winding pitch corresponding to an integer multiple of an electrical angle of 360 degrees in the circumferential direction, a part or all of magnetic fluxes excited by the power supply currents Ipsw interlinking with the first power reception winding;
a second power reception winding PRW2 arranged at the rotor, wherein the second power reception winding PRW2 is arranged at circumferential positions of the rotor at a winding pitch corresponding to an integer multiple of an electrical angle of 360 degrees in the circumferential direction, the circumferential positions of the second power reception winding PRW2 being different from the circumferential positions of the first power reception winding PRW1 in the circumferential direction, a part or all of magnetic fluxes excited by the power supply currents Ipsw interlinking with the second power reception winding PRW2;
a rectifier REC1 arranged at the rotor to rectify an output current of the first power reception winding PRW1;
a rectifier REC2 arranged at the rotor to rectify an output current of the second power reception winding PRW2; and
a field winding FM wound around the N magnetic pole, the S magnetic pole, or both the N and S magnetic poles, and
the field winding FM is configured to receive a field current If generated based on the output currents of the rectifiers REC1 and REC2 such that the N and S magnetic poles are magnetically excited.

2. The AC motor of claim 1, wherein
the stator windings SSW for the multiple phases include
a U-phase winding for a U-phase, the U-phase being one of the multiple phases, wherein
the U-phase winding comprises two windings composed of:
a U1-phase winding U1M configured as a part of the power supply windings PSW, a U1-phase current Iu1 being supplied to the U1-phase winding U1M; and
a U2-phase winding U2M configured as a part of the power supply windings PSW, a U2-phase current Iu2 being supplied to the U2-phase winding U2M, the U2-phase winding U2M being wound apart from the U1-phase winding U1M by an electrical angle range of 360 degrees in the circumferential direction;
the AC motor comprising:
a driver DRU1 supplying the U1-phase current Iu1 to one of the U1-phase and U2-phase windings U1M and U2M, the U1-phase current Iu1 being a sum of Iu/2+If2, where a current Iu/2 is a U-phase current component having a frequency fac and a field excitation current component If2 having the frequency ffm; and
a driver DRU2 supplying the U2-phase current Iu2 to the other of the U1-phase and U2-phase windings U1M and U2M, the U2-phase current Iu2 being a difference of Iu/2−If2, where the current Iu/2 is the U-phase current component having the frequency fac and the field excitation current component If2 having the frequency ffm.

3. The AC motor of claim 1, wherein
the N and S magnetic poles comprise:
a plurality of soft magnetic portions positioned parallel to each other,
an air gap, a resin member, or a permanent magnet positioned between the soft magnetic portions, and
a further permanent magnet arranged magnetically serially to a path of the soft magnetic portions in a magnetic flux direction within the path.

4. The AC motor of claim 1, wherein the motor is a five-phase motor having four or more poles, when the five phases consisting of an A-phase, a B-phase, a C-phase, a D-phase, and an E-phase arranged in this order in the stator, the A- to E-phases are located within a range of 0 to 720 degrees in the electrical angle in the circumferential direction,
wherein the five-phase motor comprises:
A-phase windings wound in slots located at electrical angles 0 and 144 degrees,
B-phase windings wound in slots located at electrical angles 72 and 216 degrees,
C-phase windings wound in slots located at electrical angles 144 and 288 degrees,
D-phase windings wound in slots located at electrical angles 216 and 360 degrees, and
E-phase windings wound in slots located at electrical angles 288 and 72 degrees.

5. The AC motor of claim 1, wherein
the circuitry is configured to:
i) increase or decrease an AC field excitation current component If2 supplied to the power supply winding PSW so that the field current If is increased or decreased, wherein the field excitation current component If2 is required on the stator side in order to supply the field current If to the field winding FM, and
ii) detect rotation positions of the rotor by detecting changes in voltage components induced, due to electromagnetic induction, across each of the respective phase windings of the stator in response to changes in the field excitation current component If2.

6. The motor of claim 1, wherein the rectifiers are full-wave rectifiers.

7. The motor of claim 6, comprising a circuitry supplying a field current If to the field winding FM based on the output currents of the rectifiers REC1 and REC2 such that the N and S magnetic poles are magnetically excited.

8. A multiple-phase AC electric motor provided with four or more poles; comprising:
a stator:
stator windings SSW wound around the stator and configured to receive multiple-phase currents:
a rotor arranged to be opposed to the stator via a gap and configured to be rotatable, the rotor having N and S magnetic poles: and
power supply windings PSWS arranged at a pitch corresponding to QN times of an electrical angle 360 degrees in the circumferential direction of the stator, wherein the QN is a variable of 2 or more, the power supply windings PSWS are provided differently from windings which supply the multiple-phase AC currents, wherein the power supply windings PSWS are configured to receive power supply currents Ipsw whose frequency ffm is different from a frequency fac of the multiple-phase currents, the power supply currents being superposed on the multiple-phase currents;

a first power reception winding PRW1 arranged at the rotor, wherein the first power reception winding PRW1 is arranged at circumferential positions of the rotor at a winding pitch corresponding to an integer multiple of an electrical angle of 360 degrees in the circumferential direction, a part or all of magnetic fluxes excited by the power supply currents Ipsw interlinking with the first power reception winding PRW1;

a second power reception winding PRW2 arranged at the rotor, wherein the second power reception winding PRW2 is arranged at circumferential positions of the rotor at a winding pitch corresponding to an integer multiple of an electrical angle of 360 degrees in the circumferential direction, the circumferential positions of the second power reception winding PRW2 being different from the circumferential positions of the first power reception winding PRW1 in the circumferential direction, a part or all of magnetic fluxes excited by the power supply currents Ipsw interlinking with the second power reception winding PRW2;

a rectifier REC1 arranged at the rotor to rectify an output current of the first power reception winding PRW1;

a rectifier REC2 arranged at the rotor to rectify an output current of the second power reception winding PRW2; and a field winding FM wound around the N magnetic pole, the S magnetic pole, or both the N and S magnetic poles, wherein the field winding FM is configured to receive a field current If generated based on the output currents of the rectifiers REC1 and REC2 such that the N and S magnetic poles are magnetically excited.

9. The motor of claim 8, wherein the rectifiers are full-wave rectifiers.

10. The motor of claim 9, comprising a circuitry supplying a field current If to the field winding FM based on the output currents of the rectifiers REC1 and REC2 such that the N and S magnetic poles are magnetically excited.

* * * * *